(12) United States Patent
Richards et al.

(10) Patent No.: US 8,787,353 B2
(45) Date of Patent: Jul. 22, 2014

(54) METHOD AND SYSTEM FOR DIRECTED CALL ESTABLISHMENT TO FACILITATE THE PROVISION OF ENHANCED COMMUNICATIONS SERVICES

(75) Inventors: Philip Richards, Ottawa (CA); Andre Moskal, Kanata (CA); David Bridge, Balgowlah (AU); Frank Tom, Ottawa (CA); Lloyd Williams, Ottawa (CA); Masilamany Raguparan, Dunrobin (CA); Alexander Markman, Thornhill (CA)

(73) Assignee: Broadview Networks, Inc., Rye Brook, NY (US)

( * ) Notice: Subject to any disclaimer, the term of this patent is extended or adjusted under 35 U.S.C. 154(b) by 1392 days.

(21) Appl. No.: 11/461,649

(22) Filed: Aug. 1, 2006

(65) Prior Publication Data
US 2008/0043659 A1 Feb. 21, 2008

(51) Int. Cl.
*H04W 36/00* (2009.01)
(52) U.S. Cl.
CPC .......... *H04W 36/0066* (2013.01); *H04W 36/00* (2013.01); *H04W 36/0005* (2013.01); *H04W 36/0011* (2013.01); *H04W 36/0016* (2013.01); *H04W 36/0055* (2013.01)
USPC ........... 370/352; 455/436; 455/439; 455/440; 455/446
(58) Field of Classification Search
CPC ..... H04W 36/18; H04W 36/30; H04W 36/14; H04W 36/08; H04W 36/0055; H04W 36/00; H04W 36/0016; H04W 36/0066; H04W 80/04; H04W 92/02; H04W 40/36; H04W 76/02; H04W 36/0005; H04L 65/1069; H04L 65/1083
USPC .......... 370/313, 352–356; 455/436, 439, 440, 455/446
See application file for complete search history.

(56) References Cited

U.S. PATENT DOCUMENTS

| 6,839,422 B2 * | 1/2005 | Williams et al. ......... 379/221.08 |
| 2005/0003821 A1 | 1/2005 | Sylvain |
| 2005/0058125 A1 | 3/2005 | Mutikainen et al. |

(Continued)

FOREIGN PATENT DOCUMENTS

WO WO0176276 11/2001

OTHER PUBLICATIONS

International Search Report issued on corresponding International PCT Application Serial No. PCT/CA2007/001322 on Nov. 30, 2007.

(Continued)

*Primary Examiner* — Asad Nawaz
*Assistant Examiner* — Najeebuddin Ansari
(74) *Attorney, Agent, or Firm* — Dennis R. Haszko (57) ABSTRACT

A method and system for directed call establishment to anchor selected cellular calls in a Voice over Internet Protocol (VoIP) or an IP Multi-Media Subsystem (IMS) network employs a mobile handset application client to interrupt selected cellular call initiations and request a directed call establishment number from a converged services node. A call placed to the directed call establishment number creates a call signaling path through the converged services node in the VoIP or IMS network, which can then exercise control over the call to provide enhanced call services. The converged services node completes a call connection to the original called number in a manner transparent to the user of the mobile handset.

22 Claims, 7 Drawing Sheets

(56) References Cited

U.S. PATENT DOCUMENTS

| | | | |
|---|---|---|---|
| 2005/0143088 A1 | 6/2005 | Hirsbruner et al. | |
| 2005/0152521 A1* | 7/2005 | Liljestrand | 379/201.03 |
| 2005/0190772 A1 | 9/2005 | Tsai et al. | |
| 2005/0213740 A1* | 9/2005 | Williams et al. | 379/211.02 |
| 2006/0077957 A1* | 4/2006 | Reddy et al. | 370/352 |
| 2006/0109840 A1 | 5/2006 | Zenner | |
| 2006/0111112 A1 | 5/2006 | Maveddat | |
| 2006/0142010 A1* | 6/2006 | Tom et al. | 455/445 |
| 2006/0160565 A1* | 7/2006 | Singh et al. | 455/554.1 |
| 2007/0060196 A1* | 3/2007 | Sharma | 455/552.1 |
| 2007/0281704 A1* | 12/2007 | Lin et al. | 455/445 |
| 2009/0268712 A1* | 10/2009 | Bottiero et al. | 370/352 |

OTHER PUBLICATIONS

European Patent Application No. 07784989.1-1853 Extended European Search Report dated Jun. 25, 2013.

3GPP: "Voice call continuity between CS and IMS study—TR 23.806 V7.0.0", Internet Citation, Dec. 15, 2005 XP-002438622, retrieved from the Internet: URL: http://www.3gpp.org/ftp/Specsjarchive/23%5Fseriesf23.806/[retrieved on Jun. 21, 2007].

"3rd Generation Partnership Project; Technical Specification Group Core Network and Terminals; Voice Call Continuity between the Circuit-Switched (CS) domain and the IP Multimedia (IP) Core Network (CN) subsystem; Stage 3 (Release7)" 3GPP Standard; 3GPP TS 24.06, 3rd Generation Partnership Project (3GPP), Mobile Competence Centre ; V0.5.0. May 1, 2006.

* cited by examiner

METHOD AND SYSTEM FOR DIRECTED CALL ESTABLISHMENT TO FACILITATE THE PROVISION OF ENHANCED COMMUNICATIONS SERVICES

CROSS-REFERENCE TO RELATED APPLICATIONS

This first filed application for this invention.

MICROFICHE APPENDIX

Not Applicable.

TECHNICAL FIELD

This application relates in general to the delivery of enhanced communications services and, in particular, to a method and system for directed call establishment to facilitate the provision of the enhanced communications services to users of cellular radio devices.

BACKGROUND OF THE INVENTION

The provision and control of communication services in mobile networks such as the Public Land Mobile Network (PLMN) are well understood. However, the services that can be provided within the PLMN are restricted to those supported by the Signaling System 7 (SS7) Advanced Intelligent Network (AIN). More importantly, the features supported within any service providers PLMN are restricted to the SS7/AIN feature set licensed by the network provider, which may not be a full implementation of SS7/AIN.

With the advent of deregulation and the introduction of Mobile Virtual Network Operators (MVNO), the rapid and cost-effective introduction of enhanced communications services is desirable. Enhanced communications services are most readily developed and deployed within the flexible environment provided in a hosted Voice over Internet Protocol (VoIP) or an IP Multi-Media Subsystem (IMS) network. Since, inter-working between the PSTN/PLMN and the VoIP/IMS networks is now well supported; services developed in a VoIP/IMS network can now be deployed for use by devices operating in the PLMN.

However, providing those enhanced communications services to PLMN subscribers requires routing control for routing calls placed by enhanced service subscribers to the VoIP/IMS network that supports those services. This poses a problem for MNVOs, as well as for any mobile service provider that supports roaming subscribers. As is well understood by those skilled in the art, normal call routing in the PSTN/PLMN is governed by rigid rules and the dialing plan provisioned within each service provider network. Routing calls along any path other than that dictated by normal call routing in the PLMN requires network provisioning that is frequently impractical or prohibitively expensive to achieve.

There therefore exists a need for a method and system that permits calls to be established in a directed manner that permits enhanced service provision without originating PLMN network provisioning.

Furthermore, it is generally more economical for the service provider and the service subscriber to carry roaming subscriber originated calls over a packet data service to a greatest possible extent. It is therefore in the interest of both parties to pass calls to a most economical gateway in order to reduce call carriage expense.

There therefore exists a need for a method and system that permits calls to be established in the directed manner that reduces the cost of roaming subscriber originated cellular calls.

SUMMARY OF THE INVENTION

It is therefore an object of the invention to provide a method and a system for directed call establishment to reduce the cost of roaming subscriber originated cellular calls and to facilitate the provision of enhanced communications services for any cellular call launched by an enhanced communications service subscriber, regardless of whether the subscriber is roaming.

The invention therefore provides a method for directed call establishment to anchor selected cellular calls in a Voice over Internet Protocol (VoIP) or an IP Multi-Media Subsystem (IMS) network, comprising: intercepting all cellular calls launched using the mobile handset; sending a DCE request message including the called number to request a DCE dial number (DCE/DN) from a converged services node (CSN); receiving the DCE/DN from the CSN in response to the DCE request message; automatically launching a cellular call from the mobile handset to the DCE/DN; and completing a call to the called number after the CSN receives a call setup request message containing the DCE/DN.

The invention further provides a system for directed call establishment of selected cellular calls initiated by a subscriber from a mobile handset, comprising: a mobile handset application client programmed to: monitor user input to a mobile handset to intercept selected cellular telephone calls launched using the mobile handset; send a called number associated with each selected cellular call to a converged services node (CSN) to request a directed call establishment (DCE) number; receive a DCE dial number (DCE/DN) from the CSN; and launch a cellular telephone call from the mobile cellular handset using the DCE/DN; and a converged services node, comprising a DCE application programmed to: receive DCE request messages from the mobile handset application client; select a DCE/DN for each DCE request message received; and, return to the mobile handset client application a DCE response message containing the DCE/DN.

The invention further provides a mobile handset application client, comprising: program instructions for monitoring user input to a mobile handset to intercept selected cellular telephone calls launched using the mobile handset; program instructions for sending a called number associated with the selected cellular calls to a converged services node (CSN) to request a directed call establishment dial number (DCE/DN); program instructions for receiving the DCE/DN from the CSN; and program instructions for launching a cellular telephone call from the mobile cellular handset using the DCE/DN.

The invention yet further provides a converged services node, comprising: a directed call establishment (DCE) application that receives a DCE request message from a mobile handset client application; stores a called number sent in the DCE request message; selects a DCE dial number (DCE/DN) for the DCE request message; returns a DCE response message containing the DCE/DN to the mobile handset client application; and, completes a call to the called number when a call setup request containing the DCE/DN is received.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a system and method for directed call establishment to reduce cost and enable the provision of enhanced services to subscribers originating cellular calls in a Public Land Mobile Network (PLMN). The system includes a mobile handset provisioned with an application client adapted to perform directed call establishment. The mobile handset cooperates with but operates independently of a converged services node (CSN). The CSN may be embodied as a Session Initiation Protocol (SIP) application server in a packet data network.

Figure 1:
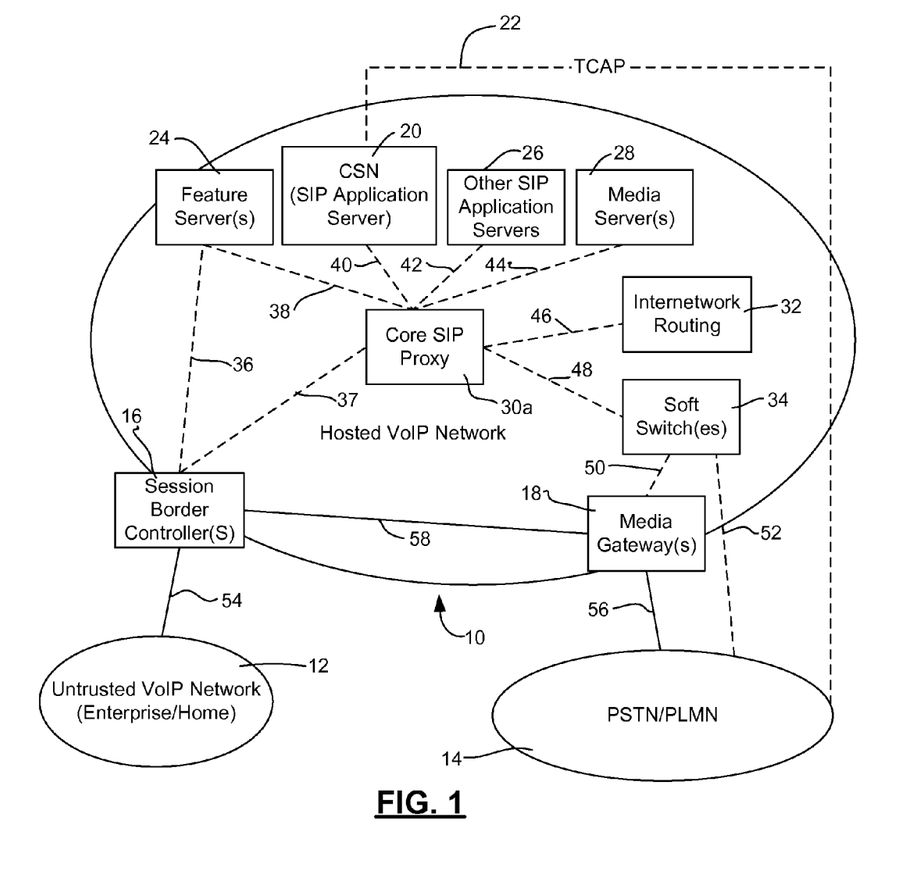
FIG. 1 is a schematic diagram of a hosted VoIP network provisioned with a converged services node (CSN) configured to provide directed call establishment in accordance with the invention.

FIG. 1 is a schematic diagram of a hosted VoIP network 10 provisioned with a CSN configured to perform directed call establishment in accordance with the invention. As is well understood by those skilled in the art, hosted VoIP networks are connected to untrusted VoIP networks 12 that serve Enterprise and/or home environments. The hosted VoIP network 10 is also connected to the PSTN/PLMN 14 to permit the offering of transparent communications services originated or terminated in any one of networks 12 and 14. The untrusted VoIP networks 12 are connected to the hosted VoIP network 10 by session border controllers 16, well known in the art. The PSTN/PLMN network 14 is connected to the hosted VoIP network 10 by Media Gateways 18 and soft switches 34.

The hosted VoIP network 10 is provisioned with the CSN 20, which acts as a SIP Application Server to provide interworking functions for specific services between the PSTN/PLMN 14 and the VoIP networks 10, 12.

The hosted VoIP network 10 further includes one or more feature servers 24 which receive incoming communications session requests from the session border controller(s) 16 via communications link(s) 36 in a manner well known in the art. The hosted VoIP network 10 further includes other SIP application servers 26 and media servers 28, both of which are known in the art. Each of the servers are connected to a core SIP Proxy 30a which has global knowledge of the hosted VoIP network 10 and controls intra-network routing. An inter-network routing server 32 provides routing control when calls must be routed to other connected networks 12, 14. Soft switches 34 perform soft switching services within the hosted VoIP network 10. The soft switches 34 are connected by signaling links 52 to PSTN/PLMN network 14 and are IP connected as indicated at 50 to the Media Gateways 18. Communication channel 58 connects the session border controllers 16 and the Media Gateways 18. Trunks 56 connect the Media Gateways 18 to the PSTN/PLMN 14. IP interfaces 38, 40, 42, 44, 46 and 48 respectively connect the feature servers 24, CSN 20, SIP application servers 26, media servers 28, inter-network routing server 32 and soft switches 34 to the core SIP Proxy 30a in a manner well known in the art. IP interfaces 36 and 37 connect the session border controllers 16 to the feature servers 24 and the core SIP Proxy 30a, likewise in a manner known in the art.

It should also be noted that the CSN 20 may be connected to the signaling network of the PSTN/PLMN 14 by any version or variant of Transaction Capabilities Application Part (TCAP) signaling links 22. This permits the CSN 20 to coordinate and control calls originating in the PSTN/PLMN 14, the hosted VoIP network 10, or other untrusted VoIP networks 12, provided that signaling routes provisioned in the respective networks are configured to route signaling messages to the CSN 20 as explained in detail in applicant's co-pending United States Patent Application Publication No. 20060142010 entitled Method, System and Apparatus for Call Path Reconfiguration filed Dec. 27, 2004, the specification of which is incorporated herein by reference.

Figure 2:
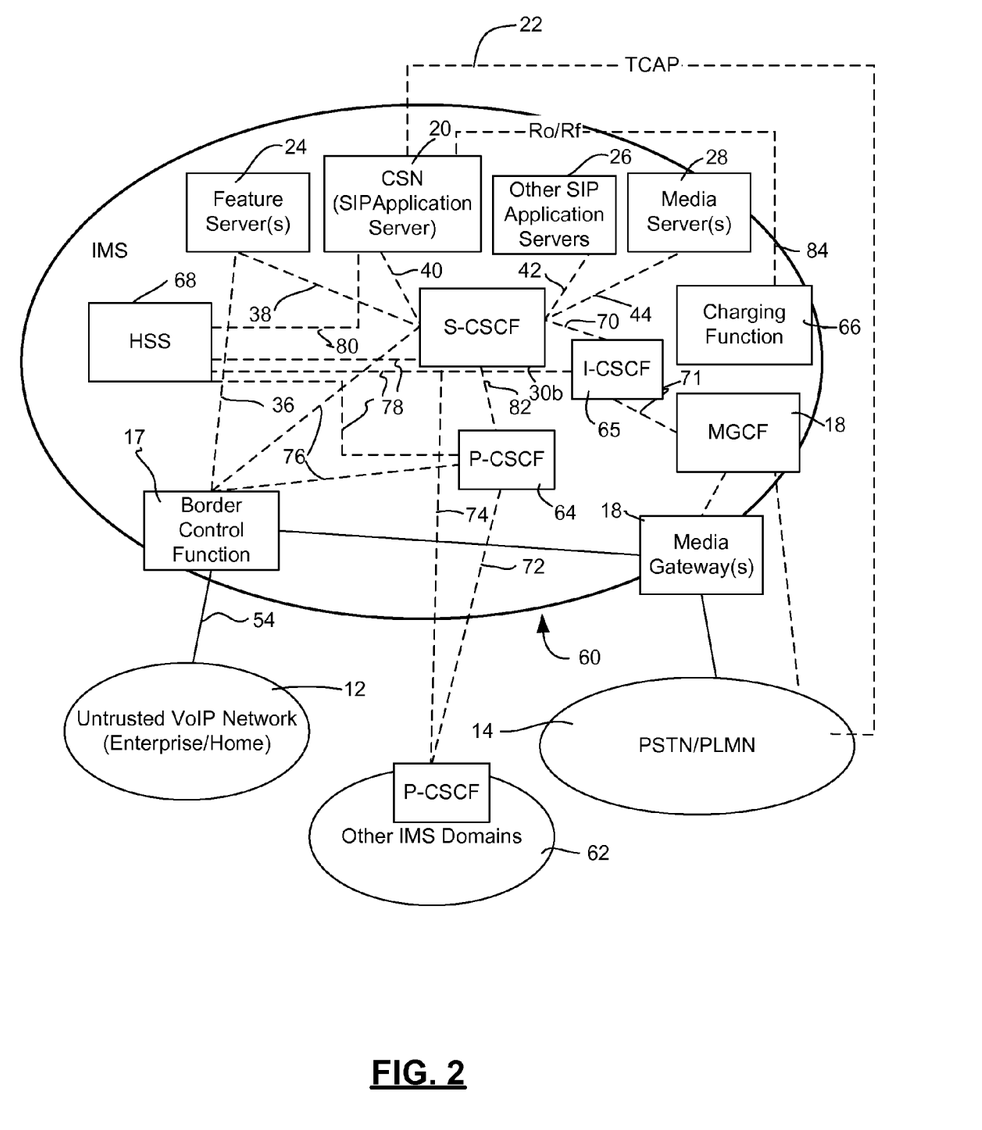
FIG. 2 is a schematic diagram of an IP Multi-Media Subsystem (IMS) network provisioned with a CSN configured to provide directed call establishment in accordance with the invention.

FIG. 2 is a schematic diagram of an IMS network 60 provisioned with the CSN 20. The IMS network 60 is connected by links 54 to: other untrusted VoIP networks 12 by border control functions 17; the PSTN/PLMN 14 by Media Gateways 18; and, other IMS domains 62 by signaling links 72 and 74. In addition to the components described above with reference to FIG. 3, the IMS 60 includes a session charging function 66 connected to the CSN 20 by signaling link 84 and a home subscriber server (HSS) 68 connected to the CSN 20 by signaling link 80 and to a proxy/service/interrogating call session control function (P-CSF) 64 by a signaling link 78.

A Serving Call Session Control Function (S-CSCF) 30b functions in a way similar to the core SIP Proxy 30 described with reference to FIG. 2, and is connected to the other network components in the same way. The S-CSCF 30b and the P-CSCF 64 are connected to the border control function(s) 17 by signaling links 76. The S-CSCF 30b is also connected to an Interrogating Call Session Control Function (I-CSCF) 65 by a signaling link 70, which is in turn connected to the Media Gateway control function (MGCF) 18 by a signaling link 71 and to the P-CSCF 64 by a signaling link 82. The S-CSCF 30b is connected to the other IMS domain 62 by a signaling link 74. The P-CSCF 64 is connected to the other IMS domains by a signaling link 72. All components, interconnections and operations of all elements of the IMS 60 are well known in the art, with the exception of the CSN 20.

As described above with reference to FIG. 1, the CSN 20 may be connected to the signaling network of the PSTN/PLMN 14 by any version or variant of Transaction Capabilities Application Part (TCAP) signaling links 22. This permits the CSN 20 to coordinate and control calls originating in the PSTN/PLMN 14, the IMS 60, other IMS domain 62 or untrusted VoIP networks 12, provided that signaling routes provisioned in the respective networks are configured to route signaling messages to the CSN 20.

Figure 3:
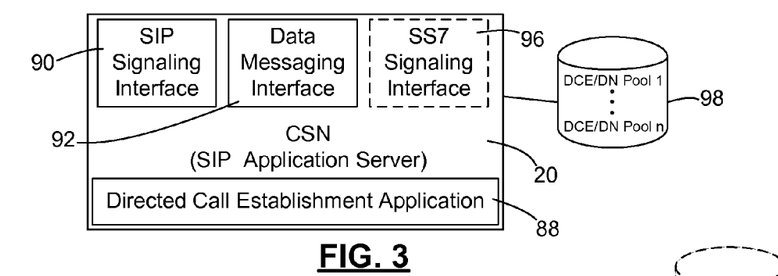
FIG. 3 is a schematic diagram of one embodiment of the CSN provisioned to provide directed call establishment in accordance with the invention.

FIG. 3 is a schematic diagram of one embodiment of the CSN provisioned to provide directed call establishment in accordance with the invention. As explained above, in this embodiment the CSN 20 is a SIP Application Server. The CSN 20 is provisioned with a directed call establishment (DCE) application 88 programmed to function as described below with reference to FIGS. 6-8. The CSN 20 is also provisioned with a SIP signaling interface 90, a data messaging interface 92, and optionally a SS7 signaling interface 96. The CSN 20 is also provisioned with a database 98 that is populated with at least one directed call establishment dial number (DCE/DN) pool. As will be explained below in detail, each DCE/DN pool contains dial numbers used to route cellular calls from a single/dual-mode mobile handset 100 (FIG. 4) through a most appropriate gateway to the CSN 20. A most appropriate gateway may be the most economical to limit cost, or a gateway that supports the required feature set, or any combination of requirements. The number of DCE/DN pools populated in the database 98 is a matter of design choice, Service Level Agreements and other factors understood by those skilled in the art.

Figure 4:
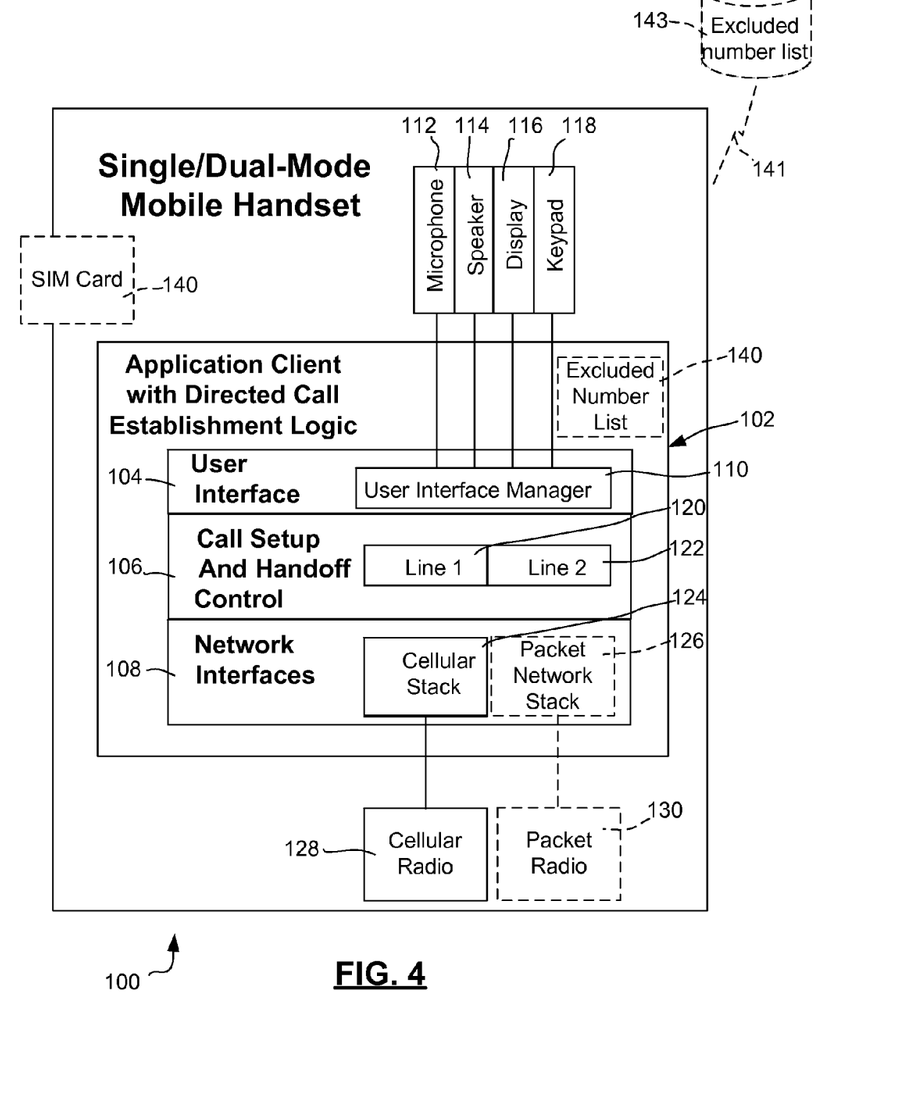
FIG. 4 is a block diagram of a single or dual-mode handset provisioned for directed call establishment in accordance with the invention.

FIG. 4 is a block diagram of a single or dual-mode mobile handset 100 provisioned with a mobile handset application client 102 that is programmed with directed call establishment logic to perform client functions for directed call establishment in accordance with the invention. The application client 102 operates cooperatively with but independently of the CSN 20 to enable the cost savings and enhanced communications services afforded by directed call establishment.

The application client 102 includes a user interface 104 provisioned with a user interface manager 110. The user interface manager 110 controls a microphone 112, a speaker 114, and a visual display 116 and accepts inputs from a keypad 118 in a manner well known in the art. The application client 102 further optionally includes a call setup and handoff control 106, which is provisioned with a first line 120 (Line 1) and a second line 122 (Line 2). Line 1 (120) and Line 2 (122) are used to enable subscriber features such as "call waiting", "3-way conference" and "call hold", all of which are known in the art.

Network interfaces 108 support a cellular stack 124, and if the mobile handset 100 is a dual-mode handset also support a packet network stack 126. The cellular stack 124 includes a set of layered protocols that are used in existing cellular networks. These protocols are used to send information to and receive information from an MSC via a base station using a cellular radio 128. Similarly, the packet network stack 126 includes a set of layered protocols for sending and receiving information via a packet network using a packet radio 130. The application client 102 is either provisioned with an excluded number list 140 or with a query mechanism 141 that permits the application client 102 to query a network database 143 which stores the excluded number list, as will be explained below in more detail with reference to FIG. 5. The excluded number list is used to store dial numbers to which directed call establishment is not applied, e.g. emergency numbers and the like. In one embodiment, the excluded number list is pre-provisioned with default excluded numbers, and may be edited by the user to add excluded numbers as desired, or to modify or delete excluded numbers that the user has added. Any call launched to a called number that is not in the excluded number list 140, 143 is a "selected call" to which direct call establishment is applied. Although the client shown in this embodiment is for a dual mode mobile handset, directed call establishment can be incorporated into a single mode mobile handset that is not part of a seamless handoff service offering.

Figure 5:
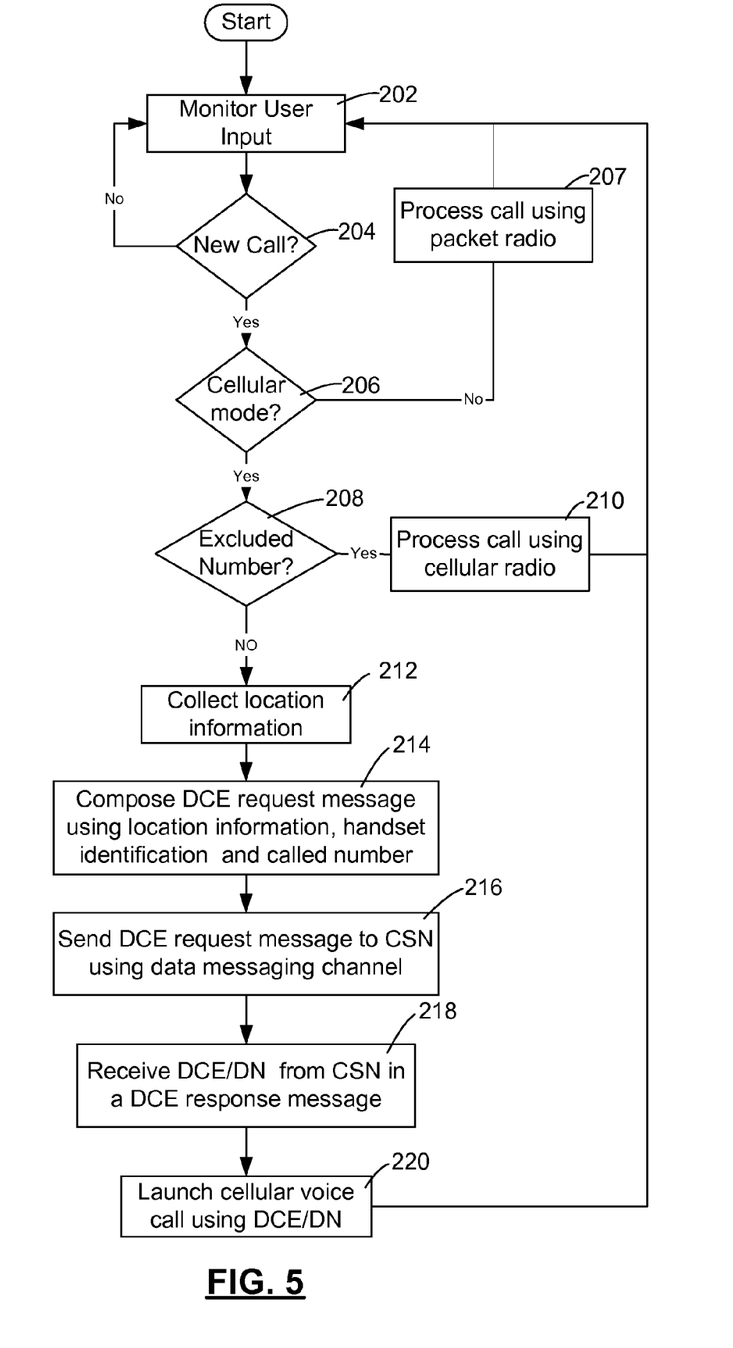
FIG. 5 is a flow diagram providing an overview of tasks performed by the single or dual-mode mobile handset shown in FIG. 4 while providing a directed call establishment service in accordance with the invention.

FIG. 5 is a flow diagram providing an overview of tasks performed by the application client 102 of the single or dual-mode mobile handset 100 shown in FIG. 3, while providing a directed call establishment service in accordance with the invention.

The application client 102 of the mobile handset 100 monitors user input (202) by monitoring the user interface 104 (FIG. 4) to determine when the user launches a new call using the keypad 118 or the speaker 114, in a manner well known in the art. If the application client 102 detects initiation of a new call (204), and the mobile handset 100 is a dual-mode device, the application client 102 determines whether the mobile handset 100 is operating in cellular mode (206). If a dual-mode mobile handset 100 is not operating in cellular mode, the application client 102 processes the new call (207) using the packet radio 130 and returns to monitoring user input (202). If the handset 100 is a single mode cellular device, steps 206 and 207 are not performed, as will be understood by those skilled in the art.

If the mobile handset 100 is operating in cellular mode, the application client 102 determines whether the new call is associated with an excluded number (208) by referring to the excluded number list 140 or querying the database to refer to the excluded number list 143 (FIG. 4). As noted above, any number may be designated an excluded number; however, the numbers most likely to be placed in the excluded number list are, for example, "911" and the access number for the mobile handset 100 user's voice mailbox. If the new call has been placed to an excluded number, the application client 102 processes the call in the usual way using the cellular radio (210).

If the new call has not been placed to an excluded number, the call is selected for directed call establishment and the application client 102 collects location information (212). The location information may be collected on a continuous or periodic basis, for example on startup; when a handoff from one base station to another is performed; or on a predetermined schedule. The location information can be collected in a number of different ways. Location information (e.g., country code and area code) is routinely provided to the mobile handset 100 by cellular service providers in a manner well known in the art. Alternatively, location information can be derived from a Global Positioning System (GPS) if the mobile handset 100 is equipped with a GPS receiver. The manner in which location information is collected is not important. The location information is useful, however, in enabling a most appropriate packet data network gateway to be selected for a roaming mobile handset 100, as will be explained below in more detail with reference to FIG. 6.

the application client 102 then composes a directed call establishment (DCE) request message using: current mobile handset location information; mobile handset identification; and, the called number associated with the new call (214). The handset identification may be, for example, the mobile number associated with the mobile handset 100 or a single directory number if the user subscribes to a single directory number service. Depending on the DCE/DN selection algorithm(s) in the CSN 20, other information may also be sent in the DCE request message, such as: handset hardware configuration; attached network capabilities; etc.

The application client 102 then sends the DCE request message to the CSN 20 (216) using the data messaging channel available through the cellular radio 128, and waits for a DCE response message. As understood by those skilled in the art, the data channel may be a circuit mode data channel (for example, USSD); a packet mode cellular data channel; a Wide Local Area Network (WLAN) data channel; a Short Message Service (SMS) data channel; a Multimedia Message service (MMS) data channel; or the like. In reply to the data message sent at 212, the mobile handset 100 receives (218) a DCE response message containing a directed call establishment dial number (DCE/DN) from the CSN 20 via the data messaging channel. As will be explained below in more detail with reference to FIGS. 6-8, the DCE/DN is a temporary number used to route a signaling path for the call though the CSN 20. The application client 102 extracts the DCE/DN from the DCE response message and launches a cellular voice call using the DCE/DN as the called number (220). This establishes a call signaling path to the CSN 20 and anchors the call in a VoIP or an IMS network that hosts the CSN 20, as will be explained in more detail with reference to FIGS. 6-8.

Figure 6:
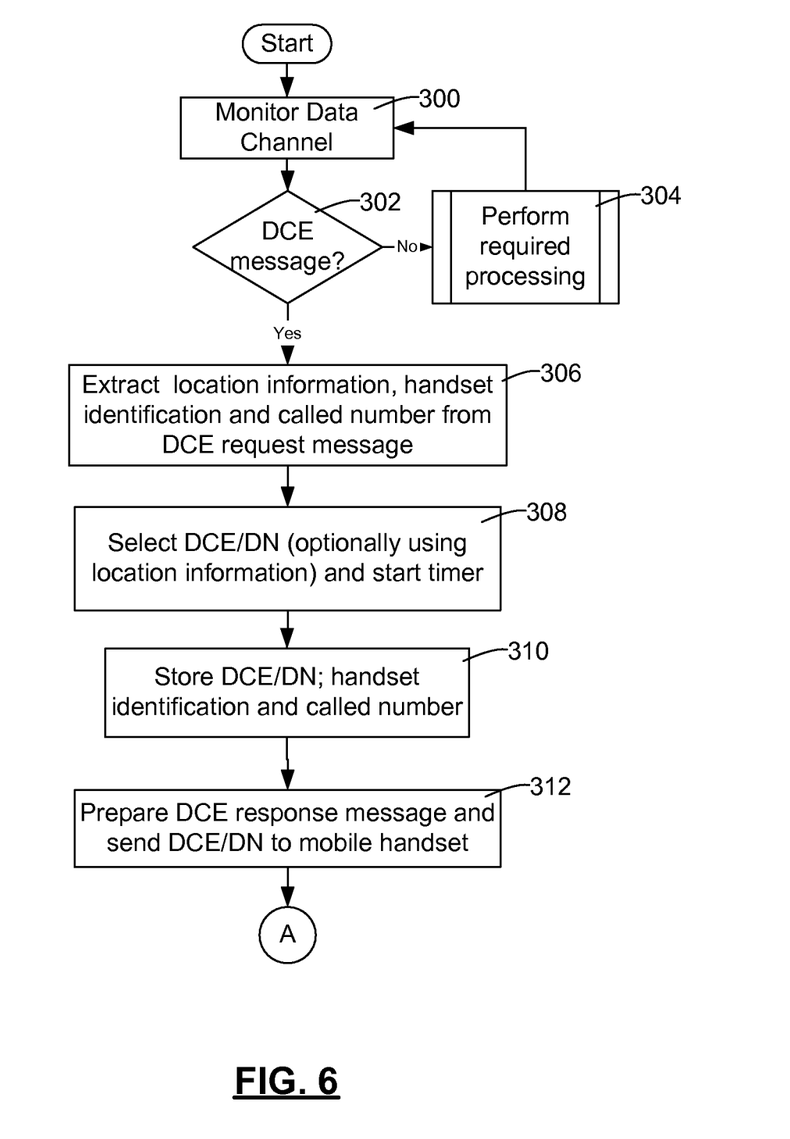
FIG. 6 is a flow diagram providing an overview of tasks performed by the CSN during a first phase of directed call establishment in accordance with the invention.

FIG. 6 is a flow diagram providing an overview of tasks performed by the DCE application 88 operating on the CSN 20 during a first phase of directed call establishment. During the first phase, the CSN 20 monitors its data channel (300) for receipt of a data message. Each time a data message is received, the CSN 20 determines whether the data message is a DCE request message (302). If the CSN 20 determines that the data message is to a DCE request message, the CSN 20 performs any processing required by the data message (304) and returns to monitoring the data channel (300). If it is determined at 302 that the data message is a DCE request message, the CSN 20 passes the DCE request message to the DCE application 88, and the DCE application 88 extracts location information, mobile handset 100 identification and the called number from a the DCE request message (306).

The DCE application 88 then selects (308) a DCE/DN from the database 98 (FIG. 3). In one embodiment, the DCE application 88 uses the location information and other optimization logic that exists in the CSN 20 to select a DCE/DN from one of a plurality of DCE/DN number pools indexed such that the location information can be used to locate a specific DCE/DN number pool from which the DCE/DN is selected. The purpose of the location-indexed DCE/DN number pools is to route the call to a most appropriate gateway to a packet data service where the call is anchored to the CSN 20, which can exercise call control. Each DCE/DN in a DCE/DN number pool is unique to that number pool and, once assigned to a call, the DCE/DN cannot be re-used for another call that requires a DCE/DN from the same number pool until the directed call setup is completed, as will be explained below in more detail. Once the DCE DN is assigned a timer is started.

Once the DCE/DN is selected and the timer is started at 308, the DCE application 88 stores a copy of the DCE/DN along with the handset identification, the called number and any other information received in the DCE request message in a memory for later retrieval (310), as will be further explained below with reference to FIGS. 7 and 8. The DCE application 88 then prepares a DCE response to the DCE request message received at 302 to sends the DCE response message (312) to the mobile handset 100.

Figure 7:
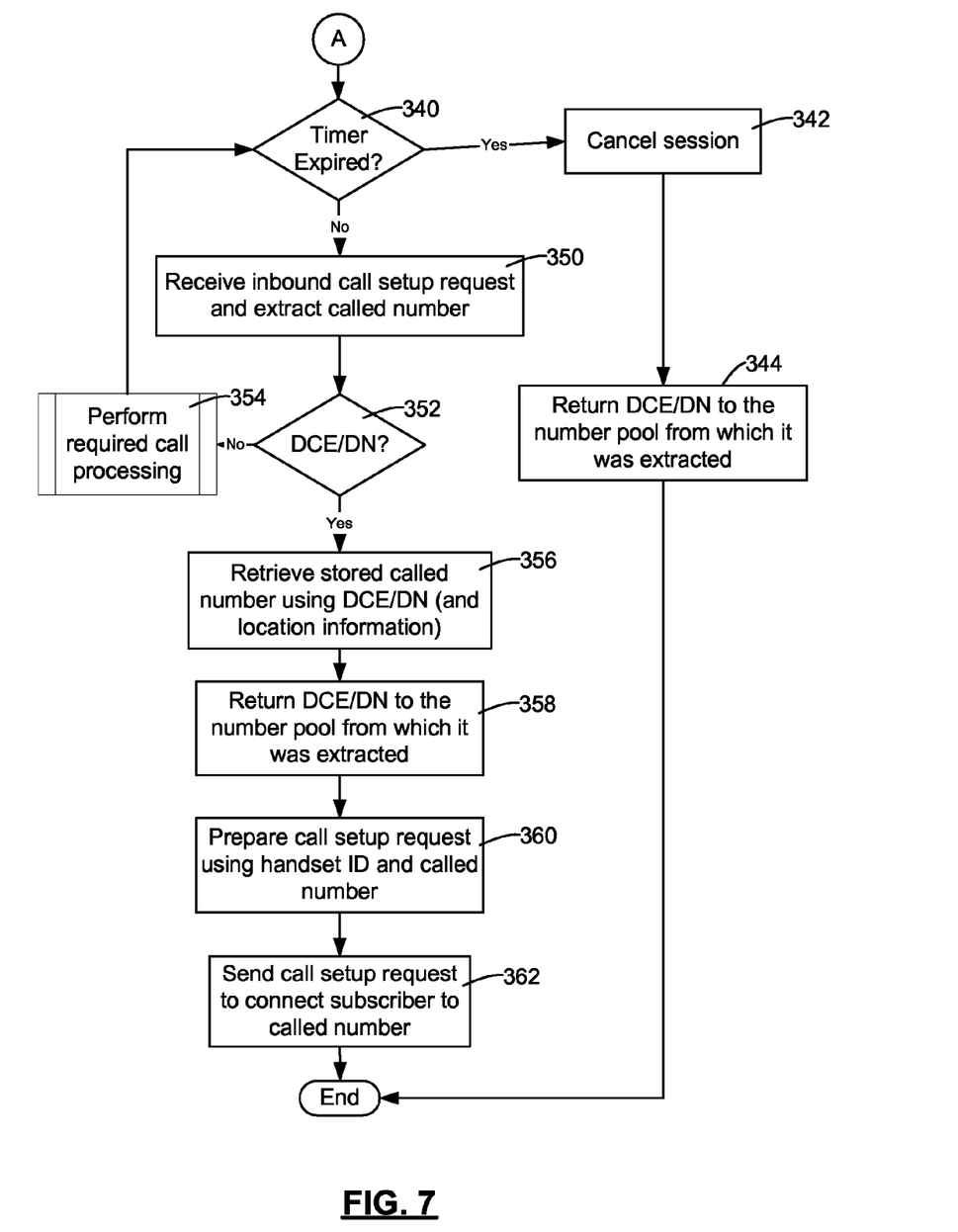
FIG. 7 is a flow diagram providing an overview of tasks performed by the CSN during a second phase of directed call establishment in accordance with the invention.

FIG. 7 is a flow diagram providing an overview of tasks performed by the DCE application 88 during a second phase of directed call establishment. As will be understood by those skilled in the art, the CSN 20 continuously monitors the timer (340) set at 308, as well as its call signaling interface(s) for inbound call control messages. If the timer set at 308 expires, it is assumed that the mobile handset 100 is unable to complete the call, and the call session is canceled (342). The CSN 20 then returns the DCE/DN to the number pool from which it was extracted (344), and processing of the call ends.

Each time an inbound call setup request is received, the called number is extracted (350). The called number is examined to determine whether it is a DCE/DN (352). If the called number is not a DCE/DN, the CSN 20 performs any required call processing (354) and returns to monitoring the timer set at 308 and its call signaling interface(s) for inbound call control messages. If the called number is a DCE/DN, the CSN 20 passes the call control message to the DCE application 88, which uses the DCE/DN (and location information if location information was used at 308 to select the DCE/DN number pool) to retrieve in the called number (356). The DCE application 88 then returns the DCE/DN to the number pool from which it was extracted (358) for use by other directed call establishment calls.

The DCE application 88 then prepares a call setup request (360) using the handset identification and the called number stored at 310. As will be understood by those skilled in the art, the handset identification is inserted in the calling party number and the called number is inserted in the called party number of the call setup request. After the call setup request is prepared, the DCE application 88 passes it to the CSN 20, which forwards the call setup request into the packet network using routing criteria well understood in the art (362) and directed call establishment ends. Because the CSN 20 is now a signaling node in the call path, it can exercise control over directed call establishment calls to effect special call features when directed to do so using any one of a plurality of special call feature activation procedures.

Figure 8:
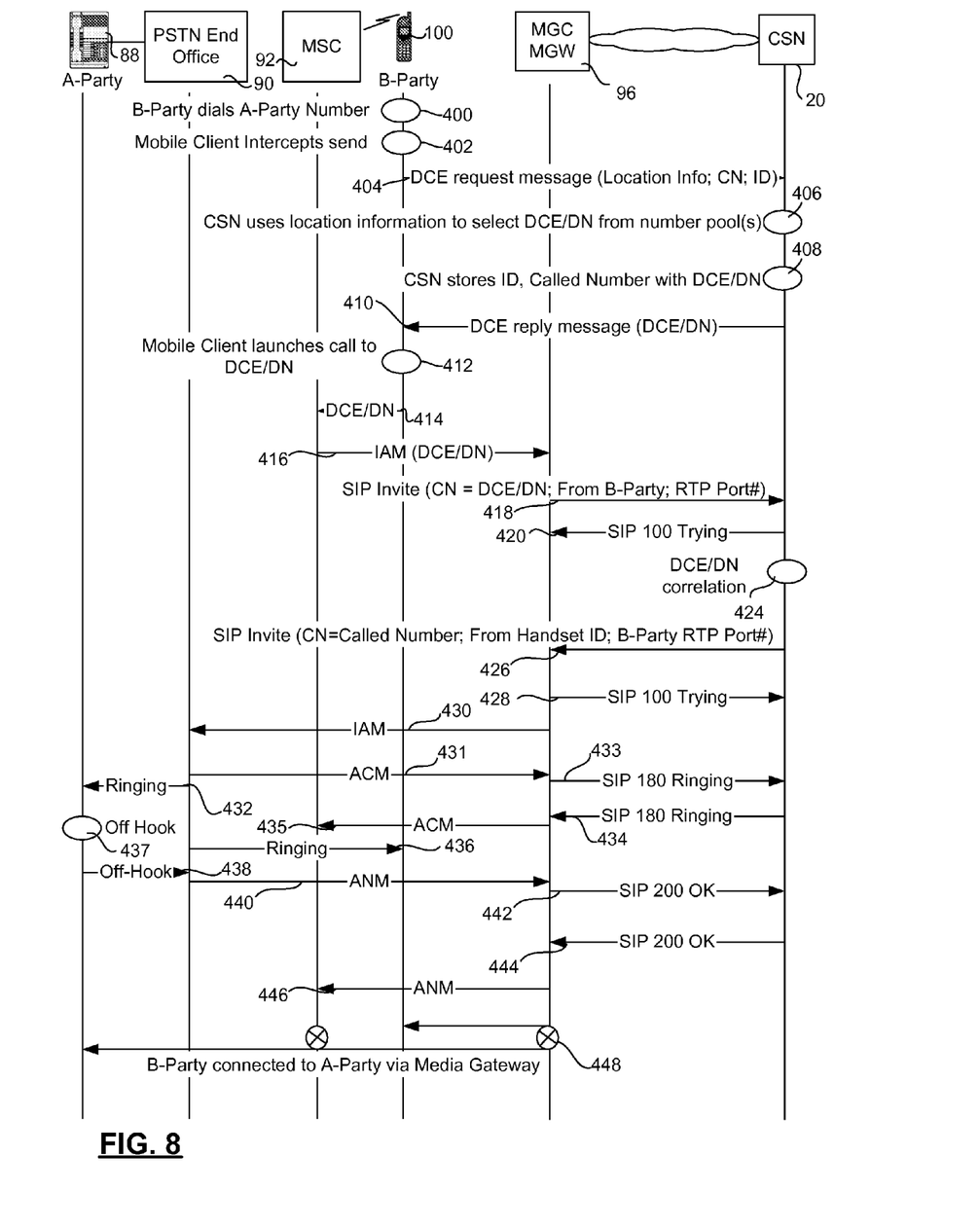
FIG. 8 is a message flow diagram schematically illustrating principle messages exchanged between components of the networks shown in FIG. 1 or 2 in providing a directed call establishment service in accordance with the invention.

FIG. 8 is a message flow diagram schematically illustrating principle messages exchanged between components of the networks shown in FIG. 1 or 2 in an example of providing the directed call establishment service. In this example, a B-Party using the mobile handset 100 dials an A-Party's number (400). A-Party in this example is using a PSTN telephone 88, but could be using a fixed-line telephone connected to a PSTN or VoIP network, or a mobile device connected to any one of a PLMN, Wi-FI, Wi-Max or VoIP network.

When B-Party launches a new call using the mobile handset 100, the application client 102 intercepts the call launch (402) and determines whether the number is on the exclusion list, as explained above with reference to FIG. 5. The application client 102 then prepares a DCE request message and sends it to the CSN 20 (404) using data messaging techniques well known in the art. The DCE request message includes location information, A-Party's number and the handset identification, as also described above with reference to FIG. 5. On receipt of the DCE request message, the DCE application 88 extracts the information sent in the DCE request message, and uses the location information by applying an algorithm to select a DCE/DN from a DCE/DN number pool (406). The DCE application 88 then stores the handset identification and the called number with the DCE/DN (408). As soon as that information is stored, the DCE application 88 formulates a DCE response message and passes it to the CSN 20, which sends the DCE response message to the mobile handset 100 (410). The DCE response message contains the DCE/DN.

When the mobile handset 100 receives the DCE response message, the application client 102 launches a call to the DCE/DN (412) provided by the CSN 20 in the DCE response message sent at 410. As will be appreciated by those skilled in the art, the user of the mobile handset 100 assumes that the call launched at 412 is the call placed to A-Party, because the process described above is entirely transparent to the user of the mobile handset 100. When the call is launched, the DCE/DN is sent over the PSTN signaling channel (414) to a Mobile Switching Center (MSC) 92 that is currently serving the mobile handset 100. The MSC 92 translates the DCE/DN using translation tables well known in the art and determines that an Integrated Services User Digital Part (ISUP) Initial Address Message (IAM) should be sent over a trunk that will direct the message to a Media Gateweay 96 associated with the DCE/DN. The MSC 92 therefore formulates the IAM and forwards it towards the Media Gateweay 96 (416). On receipt of the IAM, the Media Gateway 96 translates the DCE/DN and determines that it points to the CSN 20. The Media Gateway 96 therefore formulates a SIP Invite Message and sends it to the CSN 20 (418). The SIP Invite message contains a called number equal to the DCE/DN; and indication that the call originated from B-Party; and a RTP port number to be used for the B-Party connection. On receipt of the SIP Invite, the CSN 20 returns a SIP 100 Trying message (420) to the Media Gateway 96.

Meanwhile, the CSN 20 passes the DCE/DN to the DCE application 88 which performs DCE/DN correlation (424) with DCE/DN records stored at 408 to retrieve the information stored at that time. After finding a matching DCE/DN and retrieving the stored information, the DCE application 88 passes it to the CSN 20, which formulates a SIP Invite message that it sends to the Media Gateway 96 (426). The SIP Invite message contains a called number equal to the A-Party number; an indication that the call is from the mobile handset 100; and, the B-Party RTP Port number provided in the SIP Invite at 418. The Media Gateway 96 returns a SIP 100 Trying message (428). The Media Gateway 96 then responds by formulating an IAM message, which it sends into the PSTN signaling network (430). The IAM includes a calling party number equal to the handset identification, and a called party number equal to the called number, i.e., the A-Party number.

The called party number causes the IAM to be routed to the PSTN End Office 98, which serves A-Party telephone 88. The PSTN End Office 98 verifies that the telephone 88 is on-hook and responds with an Address Complete message (ACM) (431). The PSTN End Office 98 then applies ringing (434) to the line that supports the telephone 8. On receipt of the ACM at 431, the Media Gateweay 96 sends a SIP 180 Ringing message (433) to the CSN 20, which forwards returns a SIP 180 Ringing message towards the B-Party (434). The Media Gateway 96 responds by returning an Address Complete message (ACM) to the MSC 92 (435), and ringing applied by the PSTN End Office 90 (436) is heard by B-Party.

Meanwhile, on hearing the ringing applied at 432, A-Party takes the telephone 88 off-hook (437) and an off-hook signal is returned to the PSTN End Office 98 (438). On receipt of the off-hook signal, in the PSTN End Office 98 formulates an Answer message (ANM) and sends it to the Media Gateway 96 (440). On receipt of the ANM, the Media Gateway formulates a SIP 200 OK message and sends that to the CSN 20 (442). The CSN 20 then returns a SIP 200 OK message (444) corresponding to the SIP Invite received at 418. The Media Gateway responds by sending an ANM to the MSC 92 (446). Thereafter B-Party is connected to A-Party via the Media Gateway 96 (448), and the call signaling path extends through the CSN 20. This anchors the call at the CSN 20 and permits the CSN 20 to exercise control over the call if and when required or requested to do so.

The invention thereby provides a simple, reliable and economical mechanism for permitting cellular service providers to support enhanced call services for their roaming subscribers without the use of Service Level Agreements, which entail complex negotiations, costly network provisioning, and the like.

The invention also reduces costs for service providers and service subscribers by routing cellular calls through a most appropriate gateway to a packet data network where the call is anchored in a converged services node, which can then exercise control over the call in order to provide the enhanced call services.

It should be understood that the above-described networks, equipment and algorithms are exemplary only. The scope of the invention is therefore intended to be limited solely by the scope of the appended claims.

We claim:

1. A method for directed call establishment to anchor selected cellular calls from a public land mobile network in a Voice over Internet Protocol (VoIP) or an IP Multi-Media Subsystem (IMS) network, comprising:
   intercepting, using a mobile handset, a call dialed at the mobile handset on the public land mobile network;
   sending a directed call establishment (DCE) request message, over a data network using a packet network protocol, including the dialed number to request a DCE dial number (DCE/DN) from a converged services node (CSN), the packet network protocol being distinct from a cellular network protocol used in the public land mobile network;
   receiving the DCE request message at the CSN;
   extracting location information, handset identification and called number from the DCE request message;
   selecting the DCE/DN;
   storing the extracted handset identification and the called number indexed by a copy of the selected DCE/DN;
   preparing a DCE response message containing the DCE/DN;
   receiving at the mobile handset the DCE/DN from the CSN in response to the DCE response message;
   automatically launching a cellular call over the public land mobile network from the mobile handset to the DCE/DN;
   completing a call to the called number after the CSN receives a call setup request message containing the DCE/DN;
   wherein completing the call to the called number comprises:
     receiving an inbound call request at the CSN and extracting the called number;
     determining whether the extracted called number is a DCE/DN;
     if the extracted called number is a DCE/DN, retrieving the handset identification and called number indexed by the DCE/DN using the called number to formulate a call setup request to the called number;
     sending the call setup request to connect the subscriber to the called number; and
   anchoring the call in the CSN, the CSN exercising control over the call after the call has been established.

2. The method as claimed in claim 1 wherein intercepting all cellular calls further comprises examining a called number associated with each cellular call to determine whether the called number is an excluded number.

3. The method as claimed in claim 2 wherein if the called number is an excluded number, the method comprises immediately processing the cellular call to the excluded number using a cellular radio of the mobile handset.

4. The method as claimed in claim 2 wherein determining whether the called number is an excluded number comprises referring to an excluded number list or querying a network database to determine whether the called number is in the excluded number list.

5. The method as claimed in claim 1 further comprising collecting location information associated with a current location of the mobile handset.

6. The method as claimed in claim 5 wherein sending the DCE request message comprises formulating a DCE request message containing the dialed number, the location information and an identification of the mobile handset and sending the formulated DCE request message over a data channel available to the mobile handset.

7. The method as claimed in claim 1 wherein if the extracted called number is not a DCE/DN, the method further comprises performing any requested call processing specified by the inbound call request.

8. The method as claimed in claim 1 wherein selecting the DCE/DN comprises using the extracted location information and at least one optimization algorithm to identify a DCE/DN number pool from which the DCE/DN is to be selected.

9. The method as claimed in claim 1 further comprising returning the DCE/DN to the DCE/DN number pool after retrieving the handset identification and called number indexed by the DCE/DN.

10. The method as claimed in claim 1 wherein the CSN provides enhanced call services.

11. The method as claimed in claim 10 wherein the CSN effects special call features in response to direction from a special call feature activation procedure.

12. The method as claimed in claim 1 wherein anchoring the call in the CSN comprises establishing a call signaling path to the CSN such that the CSN is a signaling node in the call path.

13. A system for directed call establishment of selected cellular calls initiated on a public land mobile network by a subscriber from a mobile handset, comprising:
   a mobile handset application client programmed to:
   monitor user input to a mobile handset to intercept selected cellular telephone calls dialed using the mobile handset;
   send a called number associated with each selected cellular call to a converged services node (CSN) to request a directed call establishment (DCE) number, the sending being performed over a data network using a packet network protocol, the packet network protocol being distinct from a cellular network protocol used in the public land mobile network:
   receive a DCE dial number (DCE/DN) from the CSN;
   the converged services node, comprising a DCE application programmed to:
   receive DCE request messages from the mobile handset application client;
   extract location information, handset identification and called number from the DCE request message;
   select a DCE/DN for each DCE request message received;
   store the extracted handset identification and the called number indexed by a copy of the selected DCE/DN;
   prepare a DCE response message containing the DCE/DN;
   return to the mobile handset client application the DCE response message containing the DCE/DN;
   launch a cellular telephone call over the public land mobile network from the mobile cellular handset using the DCE/DN;
   complete a call to the called number after the CSN receives a call setup request message containing the DCE/DN;
   wherein completing the call to the called number comprises:
      receiving an inbound call request at the CSN and extracting the called number;
      determining whether the extracted called number is a DCE/DN;
      if the extracted called number is a DCE/DN, retrieving the handset identification and called number indexed by the DCE/DN using the called number to formulate a call setup request to the called number;
      sending the call setup request to connect the subscriber to the called number; and
   anchor the call in the CSN, the CSN exercising control over the call after the call has been established
   wherein the converged service node includes a processor.

14. The system as claimed in claim 13 wherein the CSN provides enhanced call services.

15. The system as claimed in claim 14 wherein the CSN effects special call features in response to direction from a special call feature activation procedure.

16. The system as claimed in claim 13 wherein anchoring the call in the CSN comprises establishing a call signaling path to the CSN such that the CSN is a signaling node in the call path.

17. A converged services node (CSN), comprising:
   a directed call establishment (DCE) application that:
   receives a DCE request message from a mobile handset client application over a data network using a packet network protocol, the packet network protocol being distinct from a cellular network protocol used in a public land mobile network in which a call is dialed;
   stores a called number sent in the DCE request message;
   extracts location information, handset identification and called number from the DCE request message;
   selects a DCE dial number (DCE/DN) for the DCE request message;
   stores the extracted handset identification and the called number indexed by a copy of the selected DCE/DN;
   prepares a DCE response message containing the DCE/DN;
   returns a DCE response message containing the DCE/DN to the mobile handset client application;
   launches a cellular telephone call over the public land mobile network from the mobile cellular handset using the DCE/DN;
   completes a call over the public land mobile network to the called number when a call setup request containing the DCE/DN is received;
   wherein completing the call to the called number comprises:
      receiving an inbound call request at the CSN and extracting the called number;
      determining whether the extracted called number is a DCE/DN;
      if the extracted called number is a DCE/DN, retrieving the handset identification and called number indexed by the DCE/DN using the called number to formulate a call setup request to the called number;
      sending the call setup request to connect the subscriber to the called number; and
   anchors the call in the CSN, the CSN exercising control over the call after the call has been established
   wherein the converged service node includes a processor.

18. The converged services node as claimed in claim 17 further comprising a call control signaling interface for receiving call setup messages and passing a called number extracted from the call setup message to the DCE application to determine whether a called number in the call setup message is a DCE/DN.

19. The converged services node as claimed in claim 17 further comprising a DCE/DN database for storing DCE/DNs in DCE number pools indexed by location information.

20. The converged services node as claimed in claim 17 wherein the CSN provides enhanced call services.

21. The converged services node as claimed in claim 20 wherein the CSN effects special call features in response to direction from a special call feature activation procedure.

22. The converged services node as claimed in claim 17 wherein anchoring the call in the CSN comprises establishing a call signaling path to the CSN such that the CSN is a signaling node in the call path.

* * * * *